Sept. 12, 1967   KIYOSHI ICHIHARA   3,340,698
METHOD OF AND APPARATUS FOR CRYOGENIC SEPARATION
OF COKE-OVEN GAS
Filed July 2, 1964
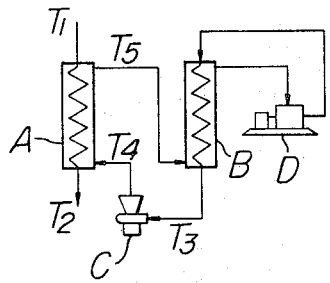
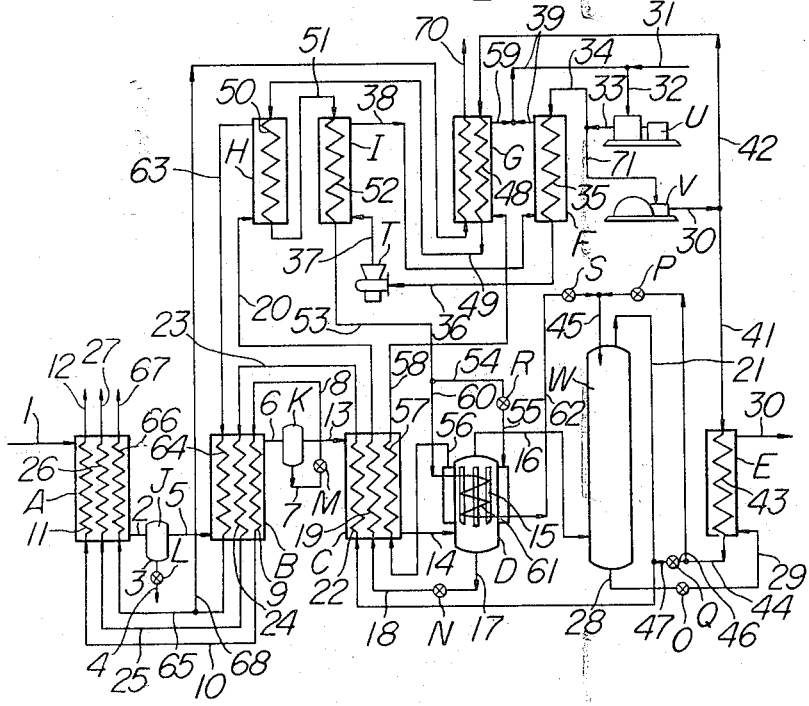
INVENTOR
KIYOSHI ICHIHARA
BY Paul M. Craig, Jr.
ATTORNEY

3,340,698
METHOD OF AND APPARATUS FOR CRYOGENIC SEPARATION OF COKE-OVEN GAS
Kiyoshi Ichihara, Hitachi-shi, Japan, assignor to Hitachi, Ltd., Tokyo, Japan, a corporation of Japan
Filed July 2, 1964, Ser. No. 379,908
Claims priority, application Japan, July 5, 1963, 38/34,474
2 Claims. (Cl. 62—23)

This invention relates to methods of an apparatus for cryogenic separation of coke-oven gas.

In general, coke-oven gas, which will be referred to herein as COG for convenience, is a gas mixture including approximately ten components, for example containing 54.2% $H_2$, 2.1% $N_2$, 6.1% CO, 0.1% $O_2$, 31.2% $CH_4$, 3.4% $C_2H_4$, 1.8% $C_2H_6$, 0.05% $C_2H_2$, and up to 1.1% $C_3$. As is well known, this gas mixture is separated into components including hydrogen, which is utilized as a raw material in the synthesis of ammonia and production of urea, ammonium sulfate, etc.

Separation of the COG into components and their purification are usually carried out by the so-called cryogenic liquefaction process, which utilizes differences between the boiling points of the components.

This process, necessarily involves various cold losses, for example, deriving from heat leak from the exterior and the temperature difference at the higher-temperature end of heat exchangers. This necessitates some means for producing cold for cold replenishment.

There are two known processes widely employed for cold production. One process relies upon the Joule-Thomson expansion or free expansion of gas (or liquid) through an expansion valve while the other utilizes adiabatic expansion of gas approximated in either a piston- or turbine-type expander, the latter process being theoretically much higher in efficiency than the former and thus preferable.

The present invention has for its primary object to provide a new and improved method of cryogenically separating coke-oven gas into its components which is highly efficient involving a minimized overall power requirement and also is highly flexible in output.

Another object of the present invention is to provide a new and improved apparatus particularly designed for performing such method of cryogenic separation of coke-oven gas into its components.

According to one aspect of the present invention, there is provided a method of cryogenically separating coke-oven gas into its components which comprises the steps of separating a liquid fraction, chiefly of methane, by fractional condensation of the gas with use of a turbine-type expander as a cryogenic source, expanding the liquid fraction approximately to the atmospheric pressure and subsequently evaporating low-boiling components of the liquid fraction by heat exchange between the latter and the feed gas to obtain a gaseous fraction at a definite temperature, causing heat exchange between the gaseous fraction and a flow of nitrogen gas compressed to a range of from 27.0 to 40 kg./cm.$^2$ gauge, and transferring cold produced with the expander to the compressed nitrogen gas after its heat exchange with the gaseous fraction thereby to minimize the fluctuation in rate of cold production deriving from variations in composition of the feed gas and from temperature variations in the system.

According to another aspect of the present invention, there is provided an apparatus for cryogenically separating coke-oven gas into its components which comprises a turibne-type expander serving as a cryogenic source, fractional condensation means for obtaining a liquid fraction, chiefly of methane, means for expanding the liquid fraction approximately to the atmospheric pressure, heat exchanger means between the liquid fraction expanded and the feed gas for evaporating low-boiling components of the liquid fraction to obtain a gaseous fraction at a definite temperature, means for heat exchange between the gaseous fraction and nitrogen gas compressed to the range of from 27.0 to 40 kg./cm.$^2$ gauge, and means for transferring cold from the turbine-type expander to the compressed nitrogen gas after its heat exchange with the gaseous fraction thereby to minimize the fluctuation in rate of cold production deriving from variations in composition of the feed gas and from temperature variations in the system.

The foregoing and other objects, features and advantages of the present invention will become apparent from the following detailed description when taken in conjunction with the accompanying drawing, in which:

FIG. 1 is a schematic flow diagram of the cold supply system employing a turbine-type expander, and FIG. 2 is a schematic flow diagram of a separation apparatus embodying the present invention.

Referring to the drawing and first to FIG. 1, the apparatus includes heat exchangers A and B, a turbine-type expander C, and a circulation compressor D. A fluid such as nitrogen gas is raised in pressure in the circulation compressor, preheated in the heat exchanger B and thereafter cooled through adiabatic expansion in the turbine C. The cold thus produced is employed to cool down another fluid flowing through the tube in heat exchanger A.

At this point, it is to be noted that in the temperature range contemplated in the present invention the fluid flowing tube-side of heat exchanger A generally has a heat capacity larger than that of the fluid flowing shell-side thereof. For this reason, the outlet temperature $T_5$ of the shell-side fluid is maintained at a fixed level which is lower than the inlet temperature $T_1$ of the tube-side fluid with a minimum temperature difference therebetween attainable with the particular construction of the heat exchanger A.

Likewise, the temperature of the compressed gas when entering the turbine C is determined by the outlet temperature $T_5$ of the shell-side fluid. In cold production with a turbine-type expander, any variation in the temperature $T_3$ of compressed gas entering the turbine causes an extraordinary fluctuation in the rate of cold production as compared with the case of free expansion and thus impairs the operational stability of the system. Particularly, if the turbine inlet temperature $T_3$ falls down excessively, some of the gas may liquefy in the outlet nozzle region of the turbine and possibly causing trouble such as damage to the nozzles.

Therefore, in the expander turbine cycle, the temperature of gas entering the turbine must at all times be held at a fixed level. Thus, the inlet temperature of the fluid flowing through the tube of heat exchanger A must be held constant. On the other hand, in cryogenic separation of COG, the raw gas usually has a composition varying over a considerable range to cause temperature variations of approximately ±10° C. in different regions of the separation system.

Accordingly, if a turbine-type expander circuit be employed as a cryogenic source for a COG separation plant in a usual easy way of thinking, extreme difficulties would be involved in operation of the system because of the variability of the turbine inlet temperature. For this reason, no turbine-type expander has heretofore been employed as a cryogenic source and cold production has exclusively been performed upon the basis of the Joule-Thomson effect, that is, free expansion of gas by means of a throttling valve, which is affected by temperature variations only to a relatively limited extent.

According to the present invention, these difficulties though the fluid may include a varying proportion in T as a cryogenic source by minimizing the fluctuation in rate of cold production deriving from variations in composition of the feed gas and from various temperature variations involved in the separation system. To this end, the entire system is arranged as schematically shown in FIG. 2. A liquid fraction chiefly of methane (for example, containing 1.2% of hydrogen ($H_2$), 2.0% of nitrogen ($N_2$), 10.0% of carbon monoxide (CO) and 86.8% of methane ($CH_4$)). As obtained by fractional condensation of the feed gas in heat exchanger D is expanded by means of an expansion valve N approximately to the atmospheric pressure, then directed through another heat exchanger C for heat exchange with the feed gas. The expanded fraction is thus heated while at the same time being liquefied. Low-boiling components of the fraction such as $H_2$, $N_2$ and CO and a part of methane ($CH_4$) therein are vaporized to obtain a gaseous fraction at a definite temperature. This gaseous fraction is directed to heat exchanger H for heat exchange with nitrogen gas, which has previously compressed to a range of 27.0 to 40 kg./cm.$^2$ gauge by a high-pressure-stage nitrogen circulation compressor V. The compressed nitrogen gas after the heat exchange is given cold produced by turbine-type expander T.

In the temperature range contemplated with the system, it is to be noted that the amount of cold retained in the liquid fraction, chiefly of methane, far exceeds the heat capacity of the feed gas because of the partial pressures of the components and therefore the methane fraction in heat-exchanging with the feed gas is only slightly vaporized and for the most part remains in the form of liquid methane. Thus, the methane fraction after heat-exchanging with the feed gas exhibits a temperature approximately equal to the boiling point of methane itself at the same pressure.

Under this condition, the fluctuation in composition of feed gas only causes variation in proportion of the gaseous portion of the methane fraction after its heat exchange with the feed gas but has no influence upon the temperature of the fraction. In this manner, a gaseous fraction can be obtained at a definite temperature though the amount of cold held in such gaseous fraction may not remain constant because of the fluctuation in composition of the feed gas, which varies the proportion of the liquid portion of the methane fraction.

Thus, though the gaseous fraction can be obtained at a definite temperature, any fluid after it has exchanged heat with the gaseous fraction will have a temperature varying with the cold content thereof. However, all fluids have apparently a definite boiling point irrespective of the proportion of the gaseous and liquid portions of the fluid. In other words, a higher cold content of a fluid means a higher proportion of its liquid portion and a lower cold content gives a higher proportion of the gaseous portion of the fluid.

According to one important feature of the present invention, such thermodynamic characteristics of fluid is utilized by selecting such a pressure under which the fluid gives a boiling point corresponding to the definite temperature of a separated fraction of feed gas with which the fluid is placed in heat-exchanging relation.

By doing this, it will be appreciated that the temperature of the fluid after it has exchanged heat with the separated fraction of feed gas can be held constant though the fluid may include a varying proportion in gaseous or liquid form and thus a temperature distribution can be obtained in the system which is favorable for efficient operation of the turbine-type expander circuit. In separation of COG, usually nitrogen gas is employed as a fluid medium for exchanging heat with the separated gas fraction, that is, the methane fraction obtained at a definite temperature, which is $-155°$ C.

Accordingly, the pressure of nitrogen gas to exchange heat with the methane fraction should be selected at a value, say, of 27.1 kg./cm.$^2$ gauge, which gives a boiling point of $-150°$ C., assuming a temperature difference of 5° C. In practice, however, any higher pressure not exceeding 40 kg./cm.$^2$ gauge can be selected without detracting from the operation frequency to any substantial extent as will readily be understood from the well-known temperature-enthalpy chart of nitrogen.

The arrangement and operation of the apparatus of the present invention will now be described in further detail with reference to FIG. 2 of the drawing.

Referring to FIG. 2, reference characters A, B, C, D, E, F, G, H and I indicate respective heat exchangers; J and K gas-liquid separators; L, M, N, O, P, Q, R and S expansion valves; T an expansion turbine; U and V the low- and high-pressure stages, respectively, of a nitrogen circulation compressor; and W a nitrogen washing tower.

Raw COG, preliminarily purified through such processes as decarbonization and desulfurization, is compressed to 12 kg./cm.$^2$ gauge, precooled to the vicinity of 0° C. and completely cleared of moisture. The COG thus purified is fed through line 1 into the heat exchanger A and cooled to a temperature of from $-90°$ C. to $-100°$ C. by heat exchange with a gaseous fraction previously obtained in the system in a manner described hereinafter. The cooled gas is then conducted through line 2 into gas-liquid separator J, where a condensate, chiefly of propane, included in the cooled gas is separated to be discharged exteriorly of the apparatus through line 3, expansion valve L and line 4 while most of the raw COG remaining in gaseous form is led through line 5 into heat exchanger B to be cooled therein to a point of from $-140°$ C. to $-145°$ C. by the cold held by return gases and further led through line 6 to second gas-liquid separator K to separate a liquid fraction, chiefly of ethylene, formed through condensation. The ethylene fraction flows through line 7 and expansion valve M to expand approximately to the atmospheric pressure. The cold of the ethylene fraction thus cooled is recovered while it is directed through line 8, coiled tube 9 of heat exchanger B, line 10 and through coiled tube 11 in heat exchanger A. The fraction is finally discharged exteriorly of the system through line 12.

On the other hand, the main flow of COG leaving gas-liquid separator K still in gaseous form is directed through line 13 into heat exchanger C to be cooled by the cold of the gaseous fraction flowing tube side of the exchanger and, leaving the latter, flows through line 14 into heat exchanger D to be cooled down therein to $-190°$ C. by the cold formed by evaporation of liquid nitrogen while rising through a multitude of vertical tubes 15 arranged in the heat exchanger D. As a result, high-boiling components such not only methane and higher-boiling-point components of COG but also some of low-boiling components such as nitrogen and carbon monoxide are liquefied to collect in the bottom of the heat exchanger D. This liquid fraction, chiefly of methane is directed through line and expansion valve N, where it is expanded approximately to the atmospheric pressure, and further through line 18 and coiled tube 19 of heat exchanger C for heat exchange with raw COG, as described hereinbefore. The liquid fraction, now including most of its low-boiling components, such as nitrogen and carbon monoxide, and part of its methane content in gaseous form and having a temperature of $-155°$ C., is led through line 20 to heat exchanger H. Raw hydrogen gas including carbon monoxide and methane and flowing from heat exchanger D into the nitrogen washing tower W, enters the latter through pipe 45 at its top and is washed with liquid nitrogen overcooled to $-100°$ C. or lower so that carbon monoxide and methane included in the gas is liquefied. The waste washing liquid including such impurity components is discharged from the bottom of the washing tower W through line 28 and expanded through expansion valve Q to the atmospheric pressure and then led through line 29 into heat exchanger E to be raised to room temperature releasing its cold to the compressed nitrogen gas, which, coming through pipe 41, flows through coiled tube 43 of the heat exchanger E, and finally discharged exteriorly of the system through line 30 as a washing waste gas. The purified gas leaving the nitrogen washing tower W at its top and now including approximately 90% of hydrogen and the rest of nitrogen flows for cold recovery through line 21, coiled tube 22 of heat exchanger C, line 23 and coiled tube 24, coiled tube 24 of heat exchanger B, line 25 and coiled tube 26 of heat exchanger A in that order and finally removed exteriorly of the apparatus as purified hydrogen.

Nitrogen gas supplied to the system through line 31 first enters the low-pressure stage U of the nitrogen compressor by way of line 32 to be compressed to 5 kg./cm.$^2$ gauge and cooled to room temperature (by a cooler not shown). The nitrogen gas leaving the compressor through pipe 33, is divided into two flows running through respective lines 34 and 71. The nitrogen gas compressed to 5 kg./cm.$^2$ gauge and running along line 34 enters heat exchanger F to flow through its coiled tube 35 and thus is preliminarily cooled to −150° C. through heat exchange with the returning flow of nitrogen gas. The cooled nitrogen gas of 5 kg./cm.$^2$ gauge is led through line 36 into expansion turbine T to expand therein approximately to the atmospheric pressure while delivering external work and thus is cooled down to approximately −100° C. Subsequently, the nitrogen gas is led through line 37 into the heat exchanger I outside of its coiled tube 52 to deliver cold to the fluid flowing therethrough and then through line 38 enters the heat exchanger F at −155° C. to flow outside of its coiled tube 35 to be restored to room temperature. Leaving the exchanger F the nitrogen gas flows through lines 39 and 32 back to the low-pressure stage U of the nitrogen compressor. On the other hand, the compressed nitrogen gas at 5 kg./cm.$^2$ gauge flowing through line 71 enters the high-pressure stage V of the nitrogen compressor to be compressed to 40 kg./cm.$^2$ gauge, is then cooled to room temperature (by a cooler not shown), and flows through pipe 30 to be divided into lines 41 and 42. That portion of the compressed nitrogen gas flowing through line 41 enters heat exchanger E to flow through its coiled tube 43 for heat exchange with the gaseous washing waste to be overcooled to −100° C. or lower and then flows through line 44 and expands through expansion valve P to the level of operation pressure in the nitrogen washing tower W to enter the latter through pipe 45 as a washing liquid.

The liquid nitrogen from line 44 entering branch 46 is expanded through expansion valve Q therein to a pressure corresponding to that of purified hydrogen flowing through line 21 and then is added to the purified hydrogen through line 47. On the other hand, nitrogen gas compressed to 40 kg./cm.$^2$ gauge and flowing through line 42 enters into coiled tube 48 of heat exchanger G to be precooled by the gaseous fraction and returning nitrogen gas flowing therethrough and then flows in succession through line 49, coiled tube 50 of heat exchanger H, line 51 and coiled tube 52 of heat exchanger I to be more or less overcooled by the cold of the gaseous fraction and that produced by expansion turbine T. The overcooled nitrogen is directed through line 53 and the most part thereof enters into line 54 to expand through expansion valve R approximately to the atmospheric pressure and then flows through line 55 into heat exchanger D outside of its tubes 15 to cool the raw gas.

The low-pressure nitrogen gas at approximately −195° C. vaporized in heat exchanger D is directed through line 56, coiled tube 57 of heat exchanger C, and then through line 58 into heat exchanger G outside of the tubes 48 and 69 arranged therein for heat exchange with the compressed nitrogen gas and is thus restored to the room temperature. The low-pressure nitrogen then flows through lines 59 and 39 back into the low-pressure stage U of the nitrogen compressor.

The nitrogen gas compressed to 40 kg./cm.$^2$ gauge and entering through line 53 into branch 60 flows further through coiled tube 61 of heat exchanger D to be overcooled to −190° C. or lower and is subsequently reduced in pressure by flowing through expansion valve S to a level corresponding to the operation pressure of the nitrogen washing tower W to join with the washing liquid nitrogen flowing through line 45.

The methane fraction completely vaporized in heat exchanger H by the nitrogen gas compressed to 40 kg./cm.$^2$ gauge leaves the heat exchanger H through line 63 while maintaining a temperature of −155° C. and flows through coiled tube 64 of heat exchanger B and mostly further through line 65 and coiled tube 66 of heat exchanger A for cold recovery. The methane fraction is finally removed exteriorly of the system through line 67. A portion of the methane fraction is branched from line 65 into line 68 to flow through coiled tube 69 of heat exchanger G for cold recovery and finally is removed exteriorly of the system through line 70.

As apparent from the foregoing, the entire power requirement for the COG separation according to the method of the present invention is limited since it employs as a cryogenic source a turbine-type expander T which is generally capable of producing a large amount of cold per unit power requirement. Moreover, such cryogenic source can be made independent from the remainder of the system and thus can maintain a definite operation temperature by minimizing fluctuation in rate of cold production. In addition to these practically important advantages, the apparatus of the present invention is extremely simple and easy to operate even when required to operate with increased or decreased output.

What is claimed is:

1. A method of cryogenically separating coke-oven gas into its components comprising the steps of separating a liquid fraction, chiefly of methane, by fractional condensation of the gas with the use of a turbine-type expander employing nitrogen gas as a refrigerating medium, expanding the liquid fraction to about atmospheric pressure and evaporating low-boiling components of the liquid fraction by heat exchange between said fraction and the feed gas to obtain a gaseous fraction at a definite temperature, causing heat exchange between the gaseous fraction and a source of nitrogen gas compressed to a pressure of about 27 to 40 kg./cm.$^2$ gauge, and transferring cold produced with the turbine-type expander to the compressed nitrogen gas after its heat exchange with the gaseous fraction thereby minimizing the fluctuation in the rate of cold production derived from variations in composition of the feed gas and from temperature variations in the system, the said nitrogen refrigerating medium being first pressurized to a low pressure, a portion of which is expanded in the said turbine-type expander and a remaining portion being further compressed in a second stage compressor to provide the said nitrogen gas of a pressure from about 27 to 40 kg./cm.$^2$ gauge.

2. An apparatus for cryogenically separating coke-oven gas into its components comprising separating a liquid fraction, chiefly methane, by fractional condensation of the gas with the use of a turbine-type expander means employing nitrogen gas as a refrigerating medium, means for expanding said liquid fraction to about atmospheric pressure, means for providing heat exchange between the expanded liquid fraction and the feed gas, for evaporating low-boiling components of the liquid fraction and to obtain a gaseous fraction at a definite temperature, means for providing heat exchange between the gaseous fraction and a nitrogen gas compressed to a pressure of from about 27 to 40 kg./cm.$^2$ gauge, means for transferring the cold from the turbine-type expander to the compressed nitrogen gas after its heat exchange with the gaseous fraction, thereby minimizing the fluctuation in the rate of cold production derived from variations in composition of the feed gas and from temperature variations in the system, means for pressurizing the said nitrogen refrigerating medium to a low pressure, a portion of which nitrogen refrigerating medium is expanded in the said turbine-type expander means, and second stage compressor means to further compress a remaining portion of nitrogen refrigerating medium to provide the said nitrogen gas of a pressure from about 27 to 40 kg./cm.² gauge.

References Cited

UNITED STATES PATENTS

| | | | |
|---|---|---|---|
| 1,830,610 | 11/1931 | Linde | 62—23 XR |
| 2,122,238 | 6/1938 | Pollitzer. | |
| 2,936,593 | 5/1960 | Grunberg. | |
| 3,233,418 | 2/1966 | Shaievitz | 62—38 |

NORMAN YUDKOFF, *Primary Examiner.*

V. W. PRETKA, *Assistant Examiner.*